US011944137B2

(12) United States Patent
Marra et al.

(10) Patent No.: US 11,944,137 B2
(45) Date of Patent: Apr. 2, 2024

(54) FACE SHIELD, MONITORING SYSTEM AND BARRIER FORMATION IN THE SAME

(71) Applicants: SOCIEDADE BENEFICENTE ISRAELITA BRASILEIRA HOSPITAL ALBERT EINSTEIN, São Paulo (BR); I-HEALTHSYS PRODUTOS MÉDICOS LTDA-ME, São Carlos (BR)

(72) Inventors: Alexandre Rodrigues Marra, São Paulo (BR); Marcelo Prado, São Carlos (BR); Renaldo Massini Junior, São Carlos (BR)

(73) Assignees: SOCIEDADE BENEFICENTE ISRAELITA BRASILEIRA HOSPITAL ALBERT EINSTEIN, São Paulo (BR); I-HEALTHSYS PRODUTOS MÉDICOS LTDA-ME, São Carlos (BR)

( * ) Notice: Subject to any disclaimer, the term of this patent is extended or adjusted under 35 U.S.C. 154(b) by 380 days.

(21) Appl. No.: 17/495,310

(22) Filed: Oct. 6, 2021

(65) Prior Publication Data

US 2022/0330629 A1 Oct. 20, 2022

(30) Foreign Application Priority Data

Apr. 16, 2021 (BR) ........................ 102021007373-0

(51) Int. Cl.
*A41D 13/11* (2006.01)
*B03C 3/017* (2006.01)
*B03C 3/32* (2006.01)
*B03C 3/47* (2006.01)

(52) U.S. Cl.
CPC ...... *A41D 13/1153* (2013.01); *A41D 13/1184* (2013.01); *B03C 3/017* (2013.01); *B03C 3/32* (2013.01); *B03C 3/47* (2013.01); *B03C 2201/32* (2013.01)

(58) Field of Classification Search
CPC ............ A63B 24/0006; A41D 13/1153; A41D 13/1184; B03C 3/017; B03C 3/32; B03C 3/47
See application file for complete search history.

(56) References Cited

FOREIGN PATENT DOCUMENTS

| | | | | |
|---|---|---|---|---|
| BR | 102020010046-7 | | 7/2020 | |
| DE | 202020000993 | | 4/2020 | |
| ES | 1247543 | | 6/2020 | |
| IT | 202000021364 | A1 * | 3/2022 | ............ G08F 18/00 |
| WO | WO-2015034183 | | 3/2015 | |
| WO | WO-2015034183 | A1 * | 3/2015 | ............ A42B 1/061 |

* cited by examiner

*Primary Examiner* — David E Smith
*Assistant Examiner* — Hsien C Tsai
(74) *Attorney, Agent, or Firm* — B. Aaron Schulman, Esq.; Stites & Harbison, PLLC

(57) ABSTRACT

A face shield and a face shield monitoring and tracking system, which enables the monitoring of the use of the face shield in real time and the transmission and storage of data and information regarding its use for further management and analysis. The face shield is also equipped with an electrostatic field provided on the surface of a front panel, to attract and retain contaminated droplet particles or aerosols present in the environment.

15 Claims, 4 Drawing Sheets

FACE SHIELD, MONITORING SYSTEM AND BARRIER FORMATION IN THE SAME

FIELD OF THE INVENTION

The present invention refers to a face shield and a monitoring and tracking system for the use of the face shield equipped with a barrier formed by an effective electrostatic attraction system for the retention of contaminated droplet particles or aerosols present in the environment.

BACKGROUND OF THE INVENTION

In some countries, such as Japan, it is common for the population to wear masks after an outbreak of flu, for example, in order to reduce viral spread and propagation. On the other hand, this is not a customary practice in Brazil and although there are means of protection, such as masks, their use has always been directed to health care workers or those with compromised immunity.

In view of this fact, in an unusual pandemic scenario, it became clear how scarce the resources to protect against viral transmission and propagation are and, when the need to use such equipment was intensified, the population was surprised with very few protection resources and exorbitant values.

A simulation carried out by the Florida Atlantic University, in the United States, and published by the journal *Physics of Fluids*, demonstrates the effect of using masks, concluding that droplets of saliva expelled during coughing might travel more than 3.5 meters and, with the use of masks/face shields, this distance is reduced to a few centimeters, showing the importance of masks in combating the spread of a virus.

Given this fact, new technologies have been developed in order to create and improve masks and face shields to provide greater efficiency and greater comfort, which implies a greater variety of options available on the market.

A means of protection that has earned market share is the face shield, which aims to prevent contamination by microorganisms from the air or from droplets and aerosols present in the environment. This type of shield protects the entire facial area, including the eyes, nose, and mouth, so that it promotes a physical barrier against droplets and aerosols, being more efficient than a conventional mask and a resource widely used in hospitals, especially in intensive care units (ICU).

Several technical solutions are known from the state of the art, aimed at the development and improvement of face shields.

In this sense, document ES1247543 discloses a clothing for facial protection against infectious agents, a clothing or an accessory fixed to the head, such as a visor, a cap, a headband or other type of clothing or accessory that can be attached to the head so as to provide additional means of protection. The additional means of protection is based on the ionization of the air that surrounds the face, in order to prevent the entry of infectious agents through the eyes, nose and mouth, for which, essentially, it comprises at least one ionizing element from the air and at least one means of directing the air towards the front of the user's head, in which the air in front of the user's face and that comes in contact with the eyes, nose and mouth becomes ionized and, consequently, virus-free.

Document WO2015034183 discloses a protective cap and more particularly a facial protector cap having an ionized air flow generator coupled to a face mask, which can be easily worn on the head, so that simultaneously with blocking the ultraviolet rays during the day, the ionized airflow forms a layer that interrupts the flow of hazardous materials to the respiratory organs, fundamentally interrupting the influx of hazardous materials to the human body, such as yellow dust and micro dust, through the respiratory organs in a more efficient way.

Document DE202020000993 reveals a facial protection for the mucous membranes of the mouth and nose for the filtration of dirt and dust, as well as for defense against bacteria, viruses and odors, characterized in that it is made with an electrically conductor material connected to a power source, in connection with a filter and an adhesive layer embedded in the filter with a labyrinth formation by clamping pressure, with the aid of wires for sealing with the sealing surface.

Document BR 10 2020 010046 7 reveals a system associated with a portable device that can be attached to breathing masks and facial protective helmets, which aims to sterilize the air being breathed by the user. The device is composed of an air inlet chamber and another air outlet chamber, separated and controlled by automatic directional flow valves, which conduct the filtered air to the conventional nasal buccal facial mask, where both chambers confine the air and through the flow labyrinth, it exposes this air to UV illumination produced by ultraviolet light semiconductor emitters in the spectral region capable of damaging the tissues and RNA of microbial agents.

OBJECTIVES OF THE INVENTION

One of the objectives of the present invention is to provide a face shield capable of providing a physical protective barrier against microorganisms present in the air through the formation of an electrostatic field.

It is also an objective of the present invention to provide a face shield with an effective barrier for the retention of contaminated droplet particles or aerosols present in the environment.

It is also one of the objectives of the present invention to provide a tracking system for the use of face shields, in order to record and store data and information on the use of the face shields, enabling subsequent management and analysis.

It is one more of the objectives of the present invention to provide a tracking system for the use of a face shield, capable of monitoring contamination and signaling the need to change equipment or recharging/sanitizing.

It is, therefore, another objective of the present invention to provide a system that provides greater safety in the use of face shield, reducing the chances of contamination.

SUMMARY OF THE INVENTION

The invention relates to a face shield comprising a front panel and a head fitting support fixed in the proximity of the upper edge of the front panel. The head fitting support includes at least one electronic module associated with a conductive plate configured to generate an electrostatic field on the outer surface of the front panel; at least one electronic module comprising: an electrostatic charge detection module configured to detect the electrostatic charge of said conductive plate; a motion sensor configured to detect at least one signal generated by a touch contact on the front panel of the face shield, and a transmission module configured to transmit at least one signal generated by the motion sensor.

The electronics module further comprises a microprocessor with internal memory configured to store data received from the motion sensor and the electrostatic charge detection module. The transmission module is one of a radio frequency transmitter, Bluetooth, Zigbee or WiFi.

The present invention also refers to a system for monitoring and forming a barrier in a face shield, which comprises:

providing an electrostatic field on an outer surface of a front panel of the face shield generated by a charging device, which is measured by means of a conductive plate configured to measure a potential difference to stop droplets and aerosols from an environment;

detecting, through a motion sensor arranged in an electronic module, information from at least one touch contact on the external surface of the front panel, wherein information from at least one touch contact is transmitted, by a transmission module, to at least one external sensor, which transmits information to at least one external server, the transmission module additionally transmits information on variations of said potential difference on the external surface of the front panel, detected by an electronic module for detecting electrostatic charge, the external server being configured to process said information and, based on the same, generate a signal of occurrence of touch contact and changes in the electrostatic field.

BRIEF DESCRIPTION OF THE DRAWINGS

The present invention will be described in more detail below, with references to the attached drawing, in which.

DETAILED DESCRIPTION OF THE INVENTION

Intensive care units (ICU) receive patients in serious health conditions, who require special care, monitoring and specific care. Thus, the ICUs receive patients with the most varied possible clinical conditions, including infectious-contagious diseases. In view of the current pandemic scenario, ICUs have made an essential contribution to the care of infected patients, especially those with respiratory complications.

The use of face shields 1 in the ICUs requires compliance with some protocols such as the restriction of touching the frontal surface and frequency of use and cleaning of the face shield 1, in order to ensure that employees will not be contaminated. However, monitoring usage and compliance with such requirements is quite a tricky thing to do.

The present invention achieves the aforementioned objectives through a traceable and monitorable face shield 1, described below based on FIGS. 1 to 6, which is equipped with an electrostatic field that prevents the user from having contact with microorganisms present in the environment 6.

Figure 1:
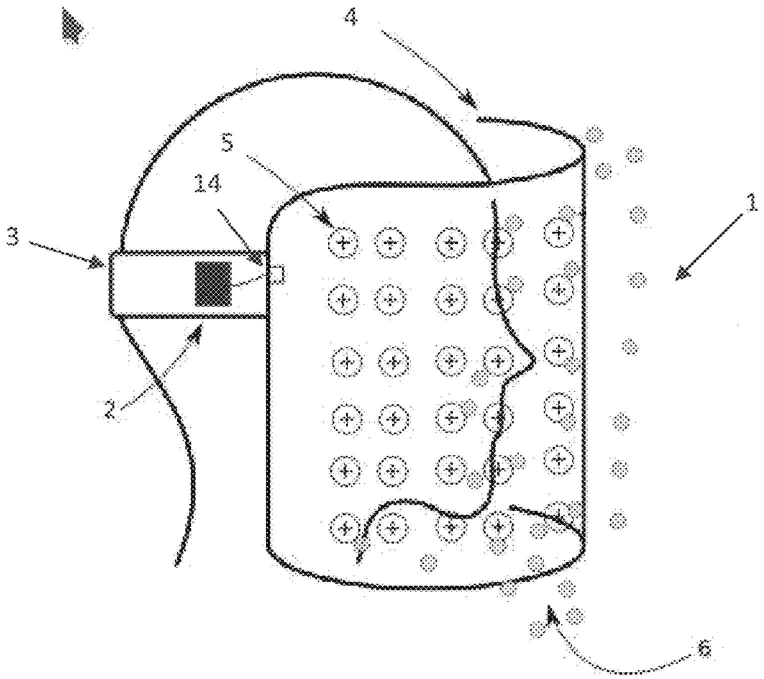
FIG. 1—is a first side view of the face shield according to the present invention, attracting droplets and aerosols present in the environment.

As shown in FIG. 1, the face shield 1 of the present invention is formed by a front panel 4 continuous and free of holes, forming a physical barrier against the passage of microorganisms to the area behind the front panel 4 of the face shield 1. The shape of the front panel 4 allows full coverage of the user's face, in order to prevent the contact of microorganisms with the eyes, nose and mouth regions. The face shield 1 further comprises a head fitting support 3, which is affixed in the vicinity of the upper edge of the front panel 4, for attaching the face shield 1 to the user's head.

As a way to improve the barrier against microorganisms, an electrostatic field 5 is generated on the external surface of the front panel 4, which attracts and retains the droplets or aerosols present in the environment 6, preventing the entry of contaminating material into the area covered by the face shield 1 and the consequent contamination of the user. Thus, the face shield 1 according to the present invention, in addition to the physical barrier provided by the front panel 4, provides an electrostatic barrier, providing additional protection to the user.

To measure the electrostatic field 5 as represented in FIG. 1, the face shield 1 is provided with at least one electronic module 2, preferably installed in the head fitting support 3. Evidently, the electronic module 2 could also be installed on the front panel 4 or in any position of the support, according to the manufacturer's interest.

Figure 3:
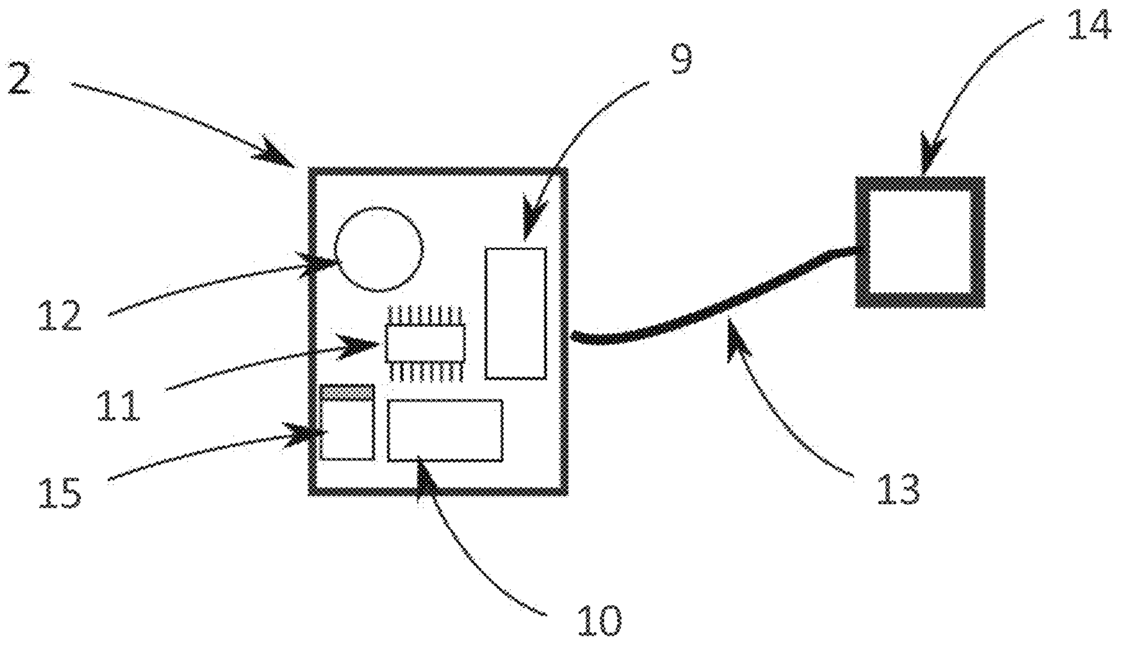
FIG. 3—illustrates the electronic module with sensors and the conductive plate present in the face shield according to the present invention.

The electronic module 2, illustrated in more detail by FIG. 3, comprises a motion sensor 9, an electrostatic charge detection module 10, a microprocessor with internal memory 11, a battery 12, and a transmission module 15.

The motion sensor 9 is a sensor capable of detecting movements associated with the front panel 4 of the face shield 1 and thus identifying an event capable of generating contamination of the face shield 1. In the case of the present invention, the motion sensor 9 is configured to identify a vibration-based touch contact, i.e. the motion sensor 9 detects vibrations on the front panel 4 and, when such vibrations have a frequency within a pre-established range, the motion sensor 9 will identify that such vibration is the result of a touch contact. Preferably, the motion sensor 9 is an accelerometer, capable of detecting accelerating vibrations.

The microprocessor 11, in turn, is the element capable of storing, in its internal memory, the captured information, such as: occurrence of a touch, number of touches, time and date of touch, information about the electrostatic field 5.

Thus, the microprocessor 11 is associated with a transmission module 15, which is one of a radio frequency transmitter, Bluetooth, Zigbee or WiFi. The transmission module 15 sends the collected data to external sensors 7 (shown in FIG. 6), which capture such data and then send it to at least one external central server 8. The sensors 7 can form a mesh network for data transmission, each sensor 7 being a node of the network. They can retransmit the data until it arrives at the central server, which can be, for example, installed inside a wing (for example, in the pivot of an ICU).

The electronic module 2 is associated with an electronic board 14, responsible for measuring the electrostatic field 5 generated on the front panel 4 of the face shield 1. In this sense, the electronic module 2 also comprises an electrostatic charge detection module 10, which measures the electrostatic charge through the electronic board and detects variations in the potential difference of the electrostatic field 5 of the front panel 4 of the face shield 1. In this way, when the electrostatic field 5 is losing its voltage and, therefore, when the electrostatic barrier starts to weaken, the electrostatic charge detection module 10 will be able to identify such an event and communicate with the microprocessor 11 and, consequently, with the transmission module 15 which, in turn, will establish communication and data transmission with external sensors 7.

The electronic module 2 is associated with an electronic board 14 by means of, for example, a conductor cable 13.

The information sent to an external computer (a central server 8) can be stored in the cloud or in a database, allowing for later management and analysis.

Figure 4:
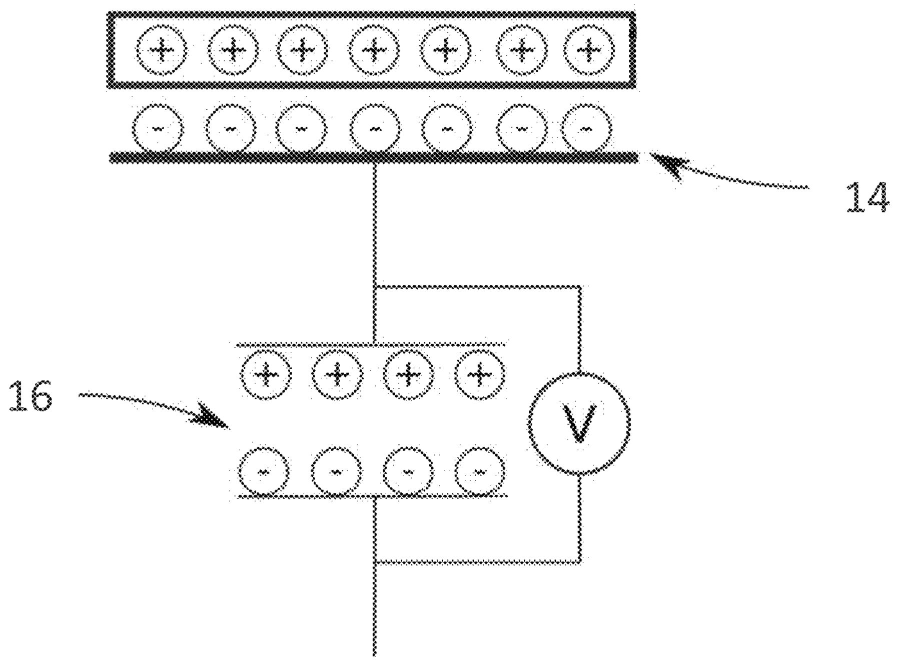
FIG. 4—illustrates the circuit capacitor charged by a voltage generated from the potential difference between the conductive plate and the front panel of the face shield according to the present invention.

In this context, FIG. 4 represents the concept applied to the formation of the electrostatic field 5, in which the different charges present on the front panel 4 and on the electronic board 14 are charged in an electrostatic charge charging circuit capacitor 16 generating a voltage V The voltage value V is measured by the electrostatic charge circuit capacitor 16 and further identified by the electrostatic charge detection module 10, which can be an analog/digital converter.

Figure 5:
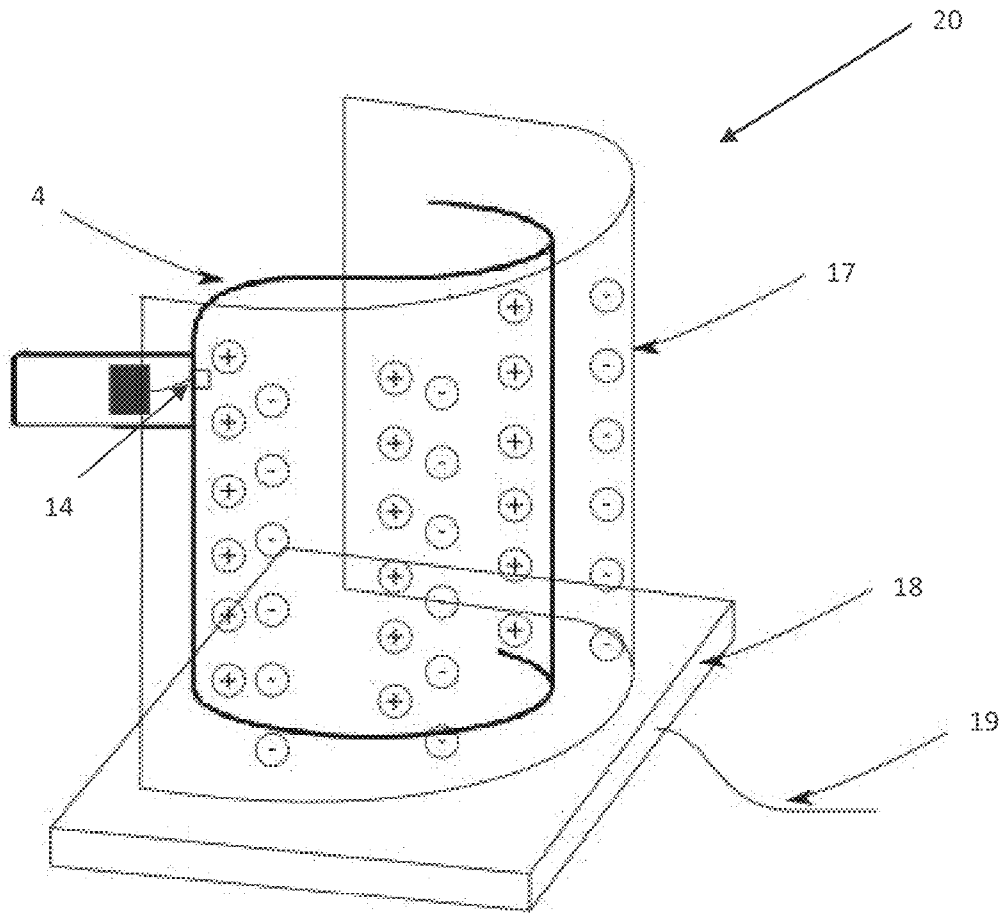
FIG. 5—is an additional perspective view representing the face shield according to the present invention during its charging in an external device for charging.

Regarding the electrostatic field 5, the electrostatic charge charging device 20 in the face shield 1 shown in FIG. 5 is composed of an electrostatic charger 17, which is electrostatically charged by the charger circuit inside the base of the charger 18. The proximity of the front panel 4 of the shield 1 to the electrostatic charger 17 will cause the same to be electrostatically charged. The base 18 has internally the microprocessed charger circuit, which after a configurable time interval depending on the charge to be applied (for example and not limited to 10 s) performs the electrostatic charging of the front panel 4 of the face shield 1.

Figure 2:
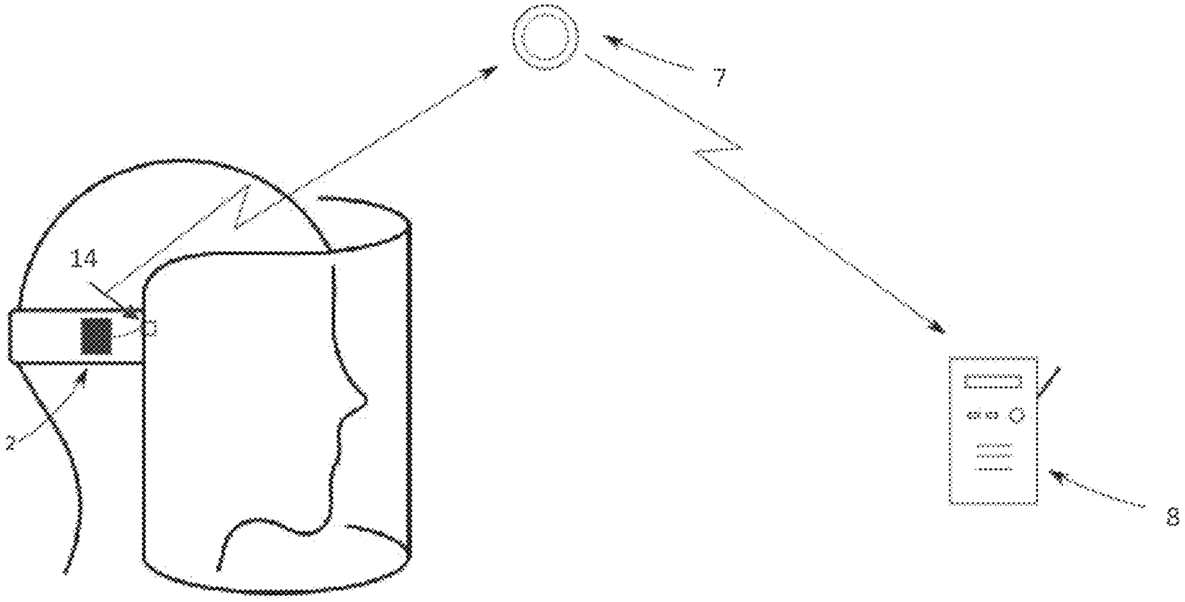
FIG. 2—is a representative view of the face shield use monitoring system according to the present invention, in which the face shield is illustrated transmitting data to a server through an external sensor.
Figure 6:
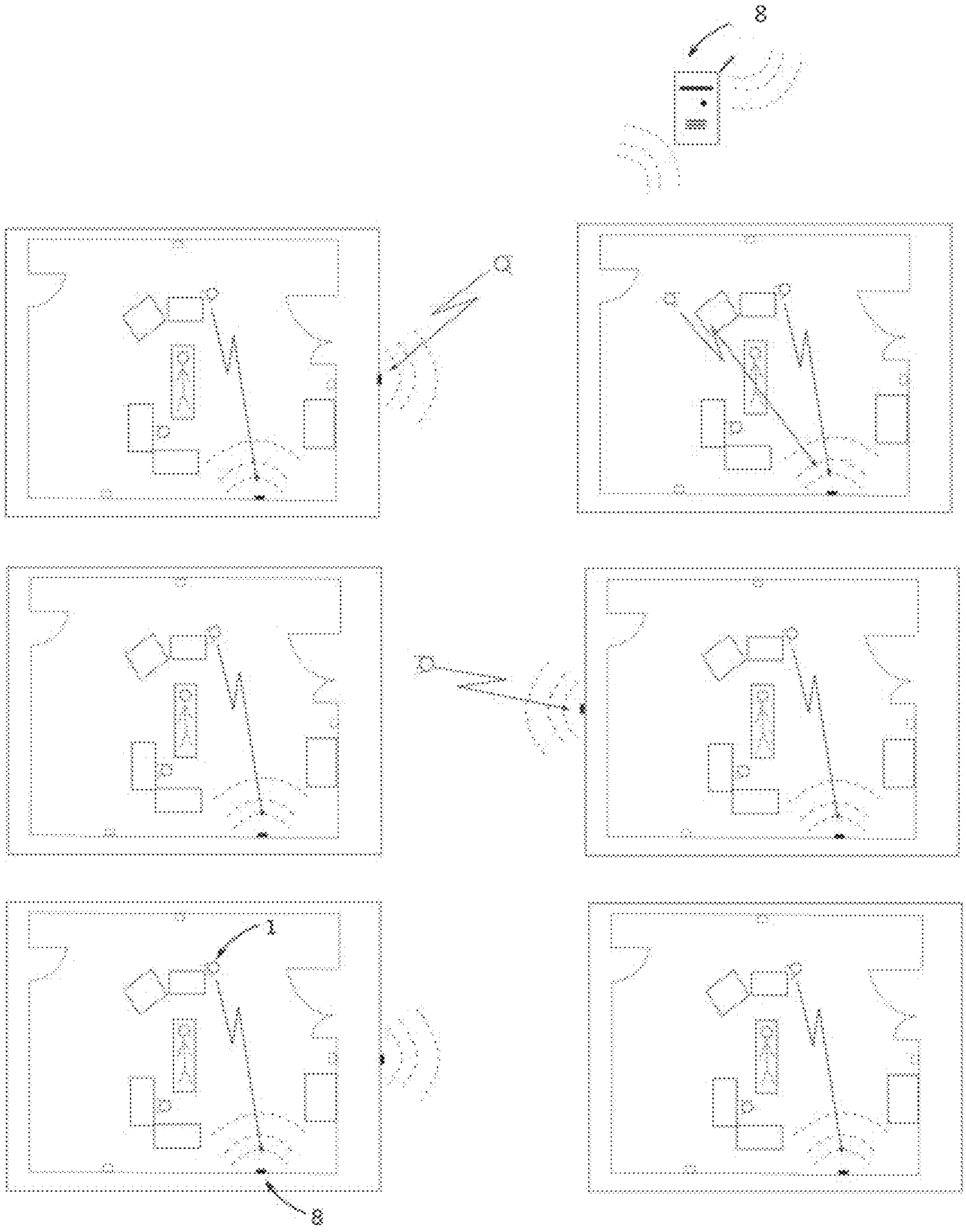
FIG. 6—is a schematic illustration of a network formed by external sensors that communicate with the face shield and with the external server of the monitoring system and barrier formation according to the present invention.

The present invention also refers to a monitoring system for the use of face shield 1, as schematically represented by FIGS. 2 and 6. According to this system, the face shield 1 according to the present invention communicates, through the transmission module 15, with at least one external sensor 7 which, in turn, is capable of sending data to at least one external server 8 for data processing. In the case of an installation with several sensors 7, for example one sensor in each ICU bed as shown in FIG. 6, the sensors 7 form a mesh network capable of receiving and retransmitting the data sent by adjacent sensors 7. With this, even the central server 8 being at a distance where it is not possible for the radio frequency signal to reach, through the network mesh formed by the sensors 7 it is possible for the radio frequency signal to be captured by the central server 8 through this network mesh formed by the sensors, with the sensor 7 closest to the server 8 being responsible for retransmitting the data from all the other sensors 7 coming from the radio frequency network mesh.

In this context, the system according to the present invention is capable of monitoring the safety of use of the face shield 1 (identifying time of use, occurrence of touch, reduction/weakening of the electrostatic barrier, need for cleaning and charging) and forming in the shield face an electrostatic protective barrier. Thus, in hospital or ambulatorial environments, where a large number of users use face shields, the system becomes even more applicable and interesting, as it allows for large-scale data management and signaling regarding use, ensuring greater safety and lower risks of proliferation of microorganisms and, therefore, contamination.

To this end, the system according to the present invention comprises providing an electrostatic field 5 on an external surface of a front panel 4 of the face shield 1 by means of an electrostatic charge charging device 20 comprising an electrostatic charger 17, which is configured to generate a potential difference on the front panel 4 and thus form a barrier to droplets and aerosols from an environment 6. Subsequently, the system detects, through the motion sensor 9, information from at least one touch contact on the external surface of the front panel, and the information from at least one touch contact is transmitted by the transmission module 15, for at least one external sensor 7 that communicates with at least one external server 8.

The transmission module 15 inside the electronic module 2 transmits information about variations of said potential difference on the external surface of the front panel 4 by detecting the electrostatic charge through the electrostatic charge detection module 10, which monitors the value of the electrostatic charge through the electronic board 14, as well as the information captured by the motion sensor 9 inside the electronic module 2.

The transmission module 15 within the electronic module 2 of the face shield 1 transmits the information described above to at least one external sensor 7, as illustrated in FIG. 6. These sensors are capable of receiving and transmitting, via, for example, WiFi, Zigbee or Bluetooth, the information from the face shield 1 to at least one external server 8. These external sensors 7 are strategically positioned (for example, in hospital beds) in environments where face shields 1 are used and can even function as a radio frequency network mesh, also transmitting the received information between them from the transmission module 15 of face shield 1, until they reach an external server 8.

The external server, in turn, processes said information and, based on the same, generates a signal of occurrence of touch contact and change in the charge of the electrostatic field 5. Thus, based on this data processing, the external server 8 will identify the moment when a certain face shield 1 needs to be changed, sanitized and recharged. The external server 8 then sends a signal to the user, informing the situation. The generated signal can be luminous, audible, or notification for mobile devices/smartphones. In another embodiment of the system of the present invention, a processor of the information collected to generate a signal of occurrence of touch contact and change in the electrostatic field 5 can be embedded in the electronic board 14 of the face shield 1, which will issue the signal to the user.

Each face shield 1 is provided with identification data that can be linked to a user and monitored in real time. Both the motion detection information and the identification information for traceability of the face shield 1 are sent to a central computer (server) or in the cloud for further access and analysis.

Having described an example of preferred embodiment of the present invention, it should be understood that the scope of the present invention encompasses other possible variations of the described inventive concept, being limited only by the content of the claims, including possible equivalents therein.

The invention claimed is:

1. A face shield comprising
a front panel; and
a head fitting support fixed in the proximity of the upper edge of the front panel,
the head fitting support including at least one electronic module associated with an electronic board configured to measure the electrostatic charge on the external surface of the front panel, which is generated by an electrostatic charger;
the at least one electronic module comprising:
an electrostatic charge detection module configured to detect the electrostatic charge measured by the electronic board;
a motion sensor, configured to detect at least one signal generated by a touch contact on the front panel of the face shield, and
a transmission module configured to transmit at least one signal generated by the motion sensor.

2. The face shield of claim 1, wherein the electronic module additionally comprising a microprocessor with internal memory configured to store data received from the motion sensor and the electrostatic charge detection module.

3. The face shield of claim 1, wherein the transmission module is selected from the group consisting of: a radio frequency transmitter, Bluetooth, Zigbee, and WiFi.

4. The face shield of claim 1, wherein the electronic module is powered by a power source.

5. The face shield of claim 4, wherein the power source is a battery.

6. The face shield of claim 1, wherein the electronic module is associated with the electronic board for measuring the electrostatic field by means of a conductor cable, which is configured to transmit the electrostatic charge value to the electrostatic charge detection module.

7. A monitoring system and barrier formation in a face shield as defined in claim 1, comprising:
providing an electrostatic field on an external surface of a front panel of the face shield by means of an electrostatic charger, the electrostatic field being continuously requested by an electronic board for electrostatic field measurement, configured to measure a potential difference for barrier to droplets and aerosols of an environment;
detecting, through a motion sensor arranged in an electronic module, information from at least one touch contact on the external surface of the front panel,
wherein information from at least one touch contact is transmitted, by a transmission module to at least one external sensor, which transmits information to at least one external server,
wherein the transmission module additionally transmits information on variations of the potential difference on the external surface of the front panel, detected by an electrostatic charge detection module, and
wherein the external server is configured to process the information and, based on the same, generate a signal of occurrence of touch contact and changes in the electrostatic field.

8. The system of claim 7, wherein the motion sensors are configured to detect at least one touch contact by detecting the frequency of vibrations in a pre-established frequency range of acceleration values caused by the touch.

9. The system of claim 7, wherein each face shield comprising a unique identification data registered and linked to a user, in order to allow its traceability.

10. The system of claim 7, wherein the information of at least one touch contact comprising the number of times the front panel was touched, the moment of occurrence of the touch and the length of use of the face shield by a given user.

11. The system of claim 7, wherein the information of at least one touch contact is stored in a microprocessor with internal memory configured to communicate with an external server.

12. The system of claim 7, further comprising transmitting data from the microprocessor with internal memory to at least one external sensor that communicates with at least one external server by a via selected from the group consisting of: radio frequency, Bluetooth, Zigbee, and WiFi.

13. The system of claim 7, wherein the generated signal is selected from the group consisting of: a luminous signal, a sound signal, and a smartphone notification signal.

14. The system of claim 7, further comprising performing, by means of an electrostatic charge charging circuit capacitor, the measurement of a voltage caused by the potential difference generated in the electrostatic field of the front panel.

15. The system of claim 7, further comprising an electrostatic charge charging device comprising a base coupled to an electrostatic charger that charges the front panel with electrostatic charge to attract the particles of droplets or aerosols contaminated by microorganisms.

* * * * *